US005207882A

United States Patent [19]

Baublys et al.

[11] Patent Number: 5,207,882

[45] Date of Patent: May 4, 1993

[54] APPARATUS FOR ELECTROCHEMICAL MARKING OF WORKPIECES

[76] Inventors: Saulius Baublys, Auf der Schutte 19, D-7148 Remseck 1; Ludwig Rommel, Salonalles 21, D-7140 Ludwigsburg, both of Fed. Rep. of Germany

[21] Appl. No.: 800,322

[22] Filed: Dec. 3, 1991

[30] Foreign Application Priority Data

Dec. 5, 1990 [DE] Fed. Rep. of Germany ....... 4038717

[51] Int. Cl.[5] ........................ C25D 17/00; C25F 7/00; B23H 9/06

[52] U.S. Cl. ................................ 204/212; 204/224 R; 204/224 M; 204/225; 204/275

[58] Field of Search .............. 204/224 R, 224 M, 212, 204/271, 225

[56] References Cited

U.S. PATENT DOCUMENTS

| | | | |
|---|---|---|---|
| 3,290,236 | 12/1966 | Mayer | 204/224 R |
| 3,410,782 | 11/1968 | Godbehere | 204/224 R |
| 3,637,468 | 1/1972 | Icxi et al. | 204/271 X |
| 3,679,558 | 7/1972 | Godbehere | 204/224 R X |
| 4,132,618 | 1/1979 | Boulanger et al | 204/224 R X |
| 4,879,015 | 11/1989 | Adamek et al. | 204/224 R |

*Primary Examiner*—Donald R. Valentine
*Attorney, Agent, or Firm*—Jones, Tullar & Cooper

[57] ABSTRACT

An apparatus for electrochemical marking of a flat or arced, preferably cylindrical metallic surface of a workpiece, which is connected to one pole of a voltage source, has a tool provided with a metallic pin, which is connected with the other pole of the voltage source. The pin is held in a tool holder of an electrically non-conducting material, which is movable in relation to the workpiece surface. A liquid electrolyte becomes effective between the tool and the workpiece surface. To make possible by means of such an apparatus the electrochemical marking of metallic surfaces of appropriate workpieces without the tool holder and the workpiece touching, it has been provided that the tool holder is provided on an area of its underside, adapted to the shape of the workpiece surface to be marked, with at least one electrolyte outlet opening, from which the electrolyte emerges under pressure, and that the pin of the tool is disposed, its writing end flush with the area of the underside of the tool holder, close to the electrolyte outlet opening, and that the tool holder is pressed with a preset force towards the workpiece surface to be marked.

11 Claims, 2 Drawing Sheets

APPARATUS FOR ELECTROCHEMICAL MARKING OF WORKPIECES

BACKGROUND OF THE INVENTION

The present invention relates to an apparatus for electrochemical marking of a metallic surface of a workpiece.

In an apparatus, known from DE 27 28 256 C3, for electrochemical marking of a metallic surface which is connected to one pole of a voltage source and which has a tool provided with at least one metallic pin connected with the other pole of the voltage source, a tool holder of an electrically non-conducting material which holds the pin or pins, and a liquid electrolyte placed between the tool and the workpiece surface, the tool holder is provided with a centered cutout at its underside, which is flat in this area, within which the tool in the pins are held, where the front ends of the pins are located in a common plane with the base surface of the cutout. Accordingly, during the marking operation the tool holder rests with the area of its underside surrounding the cutout on the metallic surface of the workpiece to be marked. The electrolyte is inserted from the outside into the space, formed by the cutout, between the marking pins of the tool and the surface of the workpiece to be marked.

Because the tool holder slides with a more or less extensive surface of its underside on the surface of the workpiece to be marked, abrasion marks on the surface of the workpiece to be marked cannot be avoided, for one, and secondly, wear of this sliding surface area of the tool holder also occurs. The latter results in the space between the tool and the surface to be marked becoming narrower, which has a disadvantageous effect on the quality of the marking. It would be possible to avoid the danger of wear of the tool holder by the use of appropriate wear-resistant plastic materials, but as a rule these plastic materials contain halogen, which is not permissible for marking of certain workpieces, for example zirconium pipes such as are used for fuel elements of reactors. A further disadvantage lies in the disadvantageous and expensive separate provision of the electrolyte used for electrochemical marking.

SUMMARY OF THE INVENTION

It is the object of the present invention to provide an apparatus of the previously described type which permits the electrochemical marking of metallic surfaces of appropriate workpieces without the tool holder and the workpiece touching each other.

To attain this object in connection with an apparatus for the electrochemical marking of metallic surfaces of workpieces of the above mentioned type, a tool holder is provided which has on an area of its underside, adapted to the shape of the workpiece surface to be marked, and preferably in the center of this area, at least one electrolyte outlet opening, from which the electrolyte emerges under pressure, the at least one pin of the tool being disposed with its writing end flush with the area of the underside of the tool holder, close to the electrolyte outlet opening, and the tool holder being pressed with a preset force towards the workpiece surface to be marked.

In the course of marking the surface of the workpiece and during the movements to be performed by the tool holder with respect to the surface of the workpiece, it is possible by means of the steps in accordance with the invention to support the tool holder floatingly on the surface of the workpiece by means of the electrolyte used for electrochemical marking. In this way there is no contact between the tool holder and the workpiece. This floating support is maintained because of the physical phenomenon referred to as "hydrodynamic paradox", where the gap through which the electrolyte supplied under pressure flows is very narrow, so that the tool holder moves along the workpiece while this gap is maintained. A further advantage lies in the more simple construction, because the tool holder can be used simultaneously for supplying the electrolyte.

An advantageous embodiment in regard to the electrolyte pressure and gap width ensues in that the pressure with which the electrolyte is pressed out is approximately 2 to 4 bar, preferably 3 bar, and that the interior radius of a cylindrical surface is larger by a few hundredths of a millimeter, preferably 2/100 mm, than the radius of the workpiece surface to be marked.

By means of providing the electrolyte outlet opening at both sides with at least one metallic pin of the tool it is attained in an advantageous manner that during marking of a workpiece with, for example, a bar code, a plurality of these line codes can be applied in one operational step. By making the metallic pins of different thickness it is possible to apply the light and heavy lines of the bar code simultaneously. By bringing the electrical connection with the metallic pins and the connection to the electrolyte outlet opening to the front face of the tool holder, it is a simple possibility of providing the electrical connections and the connections for the liquid, and thus a simplified exchange of a tool holder equipped with certain tools for another, also equipped with certain tools.

For working or marking the above mentioned zirconium pipes, it is practical to make the tool holder of a plastic material which does not contain halogen. In this case the tool holder may be made of methacrylic acid resin, for example.

For further simplifying the marking operation, the workpiece to be marked is rotatably seated and is in the shape of a tube, with a driven friction roller located opposite the rotating seat. In this case a further advantage lies in that the same friction roller is used for workpieces of different diameters.

Simple marking of flat workpiece surfaces is possible in that the surface of the workpiece to be marked is embodied to be flat, and that the tool embodied with a flat area on its underside is movable in relation to the workpiece in both coordinate directions lying in the marking plane.

BRIEF DESCRIPTION OF THE DRAWINGS

Further details of the invention can be found in the description below, in which the invention is described and explained in detail by means of the exemplary embodiment shown in the drawings. Shown are.

DESCRIPTION OF THE PREFERRED EMBODIMENT

Figure 1:
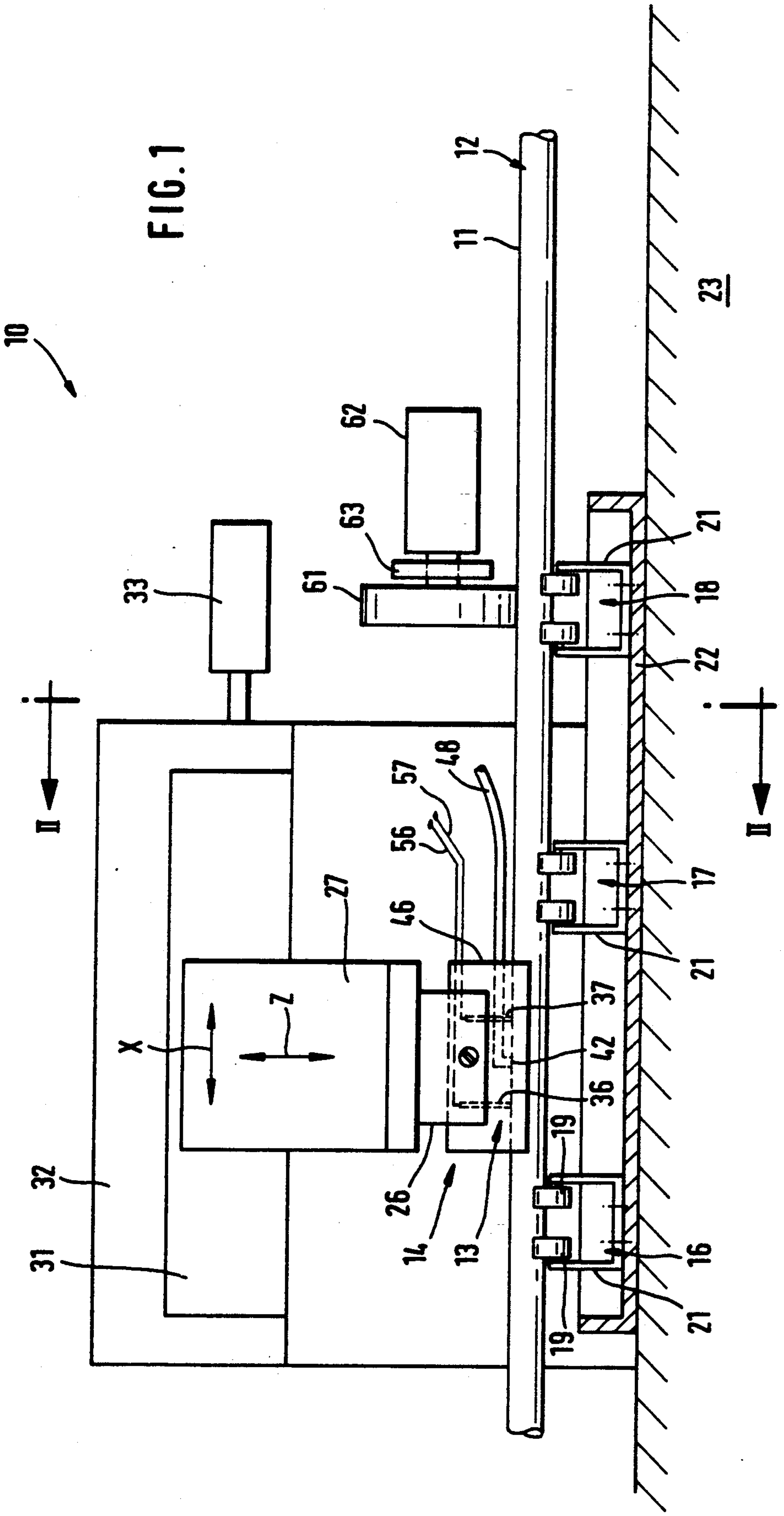
FIG. 1 which illustrates an apparatus for the electrochemical marking of a cylindrical metallic surface of a workpiece, in this case in the form of a pipe, in a schematic front view, FIG. 2 which is a section along the line II—II of FIG. 1, and FIG. 3 which is a bottom view of the tools used in connection with the exemplary embodiment in an enlarged representation.
Figure 3:
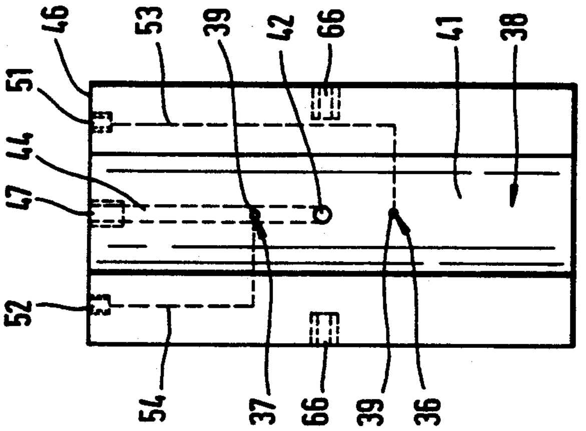

The apparatus 10, illustrated in the drawings by means of a preferred embodiment of the present invention, is used for the electrochemical marking of the metallic surface 11 of a workpiece 12, shown here in the form of a thin pipe. The metallic surface 11 or the workpiece 12 itself, if it is wholly made of metal, is connected in a manner not shown with one pole or the positive pole of a direct voltage source, the voltage of which is between 6 and 20 Volts.

The workpiece 12 rests on roller units 16 to 18, the pairs of rollers of which are rotatably seated. The rollers of each pair of rollers 19 located opposite each other are disposed and embodied in such a way that it is possible to place cylindrical workpieces 12 with different exterior diameters on them in a rotatably movable manner. The roller units 16 to 18 have U-shaped bearing blocks 21 fastened on the bottom of a pan 22, which is maintained on a workbench 23.

A tool 13 is disposed above the workpiece 12 to be marked, the tool holder 14 of which consists of an electrically non-conducting material, for example of plastic, such as methacrylic acid resin (a plastic not containing halogen), and which is seated for vertical movement in the Z-direction as well as horizontally in the X-direction according to the two double-headed arrows in FIG. 1. For this purpose the tool holder 14 is held by a clamp 26, which projects or extends vertically from the lower edge of a first carriage 27, which carriage 27 can be moved up and down in accordance with the double-headed arrow Z along a first guide 28. Movement of the first carriage 27 takes place, in a manner not shown, either with the aid of an electromotive or a pneumatic drive. In a manner not shown, it is also possible to make the tool holder 14 movable upward and downward in that it is maintained at the free end of a pivotably seated arm. The first guide 28 is fixed on a second carriage 31, which can be moved in a second guide 32 by means of a motor drive 33 in the horizontal X-direction, i.e. in the direction of the longitudinal extent of the workpiece 12.

In the exemplary embodiment, the tool 13 has two electrodes 36 and 37 embedded in the tool holder 14. The tool holder 14 has the shape of an oblong cuboid and has a groove 38, semicircular in shape, on its underside, the radius of which is greater by a few hundredths of a millimeter, preferably 2/100 of a millimeter, than the exterior radius of the cylindrical surface 11 of the workpiece or pipe 12 to be marked. The electrodes 36 and 37, which have the shape of thin metallic pins, extend vertically in respect to the groove surface 38 across the center longitudinal axis of the groove 38. In this case their writing points 39 are located in the plane of the base surface 41 of the groove 38. The two electrodes 36 and 37 are embodied with different thicknesses, for example, and are located at both sides of a center lateral axis of the tool holder 14. At the intersection of the center lateral axis and the center longitudinal axis of the tool holder 14, an outlet opening 42 of a bore 43 for liquid is provided, which starts at the base surface 41 of the groove 38 and terminates in a supply bore 44 extending parallel to the groove 38, which supply bore 44 ends in the open at a front face 46 of the tool holder 14. This supply bore 44 is provided at the front face 46 with a female thread 47, into which the nipple of a hose 48 can be removably screwed. The liquid electrolyte for electro-chemical marking is supplied through this hose 48.

A metal female thread connecting nipple 51, 52 is cut into the same front face 46 at both sides of the female bore 47, and are electrically connected by means of electrical supply lines 53, 54, cut into the tool holder 14, with the corresponding electrodes 36, 37. The electrical supply lines 53, 54 are intended for the removable screw connection with electrical supply lines 56, 57. The electrical supply lines 56, 57 can be connected with the other pole, the negative pole, of the direct voltage source, via an appropriate switch which, for example, is programmable.

Figure 2:
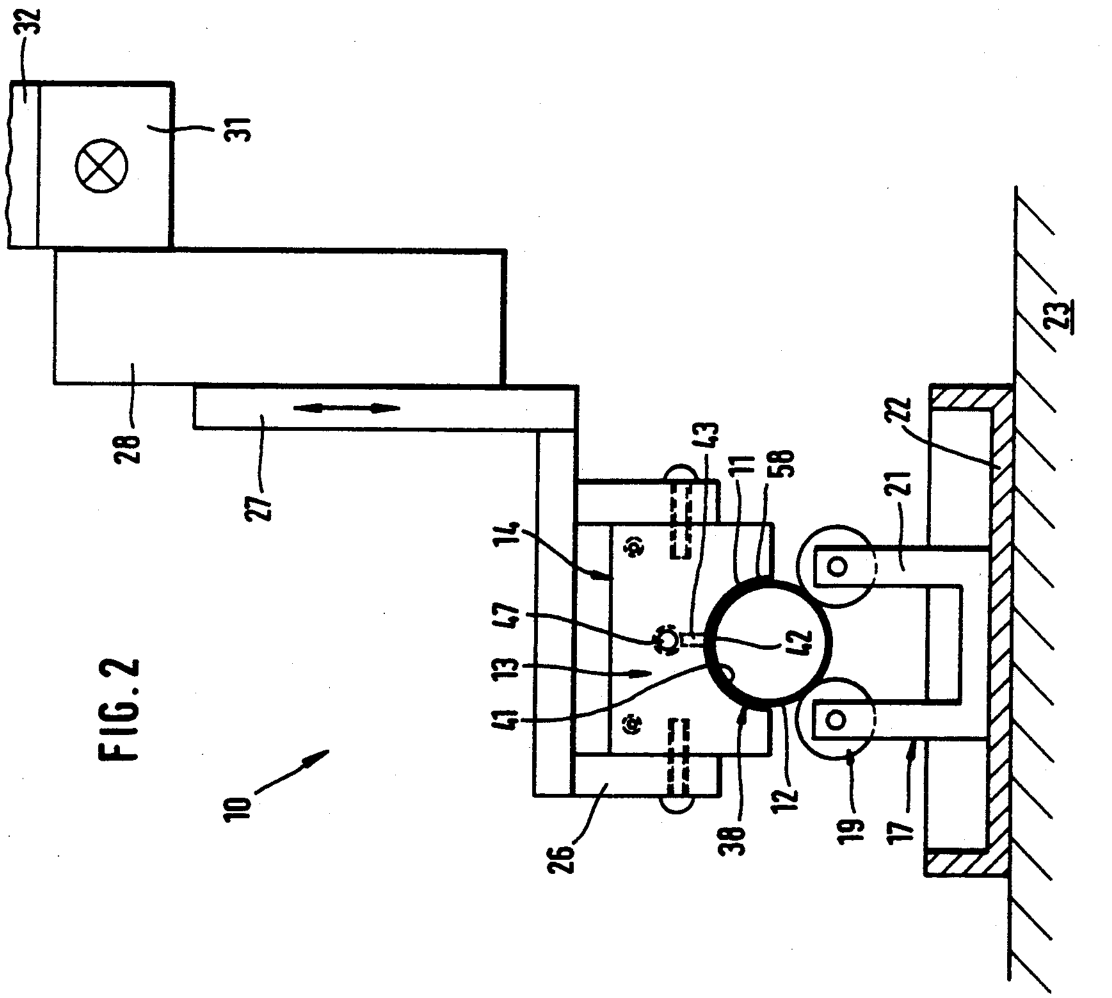

For electrochemical marking of the cylindrical surface 11 of the workpiece 12, the tool 13 or the tool holder 14 are brought down to the surface 11 under their own weight. Prior to charging the electrodes 36 and 37 with electrical current, electrolyte is pumped into the tool holder 14 via the hose 48 at a pressure between 2 and 4 bar, preferably 3 bar, and is brought from the outlet opening 42 onto the workpiece surface 11 to be marked. A gap 58 (drawn with exaggerated width in FIG. 2), corresponding to the radius difference (of 2/100 mm, for example) between the base surface 41 of the tool holder and the workpiece surface 11, is created by the common action of electrolyte pressure, the weight of the tool 13 and the difference in dimension between the exterior radius of the workpiece surface 11 to be marked and the interior radius of the groove 38 of the tool holder 14. The electrolyte is collected in the pan 22 and is returned to the tool holder 14 in a manner not shown via a pump and a filter arrangement.

In the course of marking the workpiece surface 11, the tool 13, floatingly seated with its groove base surface 41 on the workpiece surface 11, is moved back and forth in the X-direction in accordance with the marking to be performed. The workpiece 12 is simultaneously rotatingly driven. This is accomplished with the aid of a friction roller 61 driven by a motor 62. The unit composed of the friction roller 61 and the motor 62 is held on a pivot arm 63, which can, in a manner not shown, be lifted for the placement of another workpiece 12, for example one with a larger or smaller diameter, in a manner not shown. The frictional connection between the friction roller 61 and the cylindrical workpiece 12 essentially takes place under the weight of the unit 61, 62. It is understood that it is possible to press the friction roller 61 as well as the tool 13 actively, for example pneumatically, against the workpiece 12.

In an exemplary embodiment, not shown, of the present invention, the workpiece is provided with a level surface which is to be marked. For this purpose the tool is provided with a flat area on the underside and is movable in relation to the workpiece in the two coordinate directions X and Y located in the marking plane. Otherwise the tool is embodied in the same way, the floating position in particular being maintained.

It is understood that it is also possible to provide the tool 13 with only one electrode or with more than two electrodes. Furthermore, if it should be necessary, one or a plurality of further outlet openings for the electrolyte can be provided. Depending on the diameter or the radius of the marked workpiece surface 11, a tool holder 14 must be provided, the groove 38 of which has a corresponding interior radius. For this purpose the tool holder 14 is maintained in the clamp 26 with the aid of lateral female bores 66 in an easily replaceable manner.

In any case, the tool holder 14 is adapted to the surface 11 of a workpiece 12 to be marked in such a way that a floating seating of the tool holder 14 on the workpiece 12 takes place under the pressure of the supplied electrolyte, at the same time maintaining a very narrow gap 58 as a result of the effect of the physical phenomenon called "hydrodynamic paradox".

It is understood that, if needed, one or a plurality of electrodes 36, 37 for marking the workpiece surface 11 can be charged simultaneously with a voltage, either continuously or periodically.

What is claimed is:

1. An apparatus for the electrochemical marking of a metallic surface of a workpiece, adapted for connection to one pole of a voltage source, comprising:

a tool including at least one metallic pin having a writing end, said at least one pin adapted for connection with the other pole of the voltage source, and a tool holder of an electrically non-conducting material, said at least one pin being mounted in said tool holder;

means for moving the tool holder relative to the workpiece; and means for urging the tool holder toward the surface of the workpiece to be marked with a preset force, wherein:

an area of the underside of the tool holder is adapted to the shape of the workpiece surface to be marked, said area being provided with at least one electrolyte outlet opening from which electrolyte emerges under pressure, said electrolyte being situated between said underside and the workpiece surface to be marked; and the at least one pin being disposed with its writing end flush with the area of the underside of the tool holder, adjacent the electrolyte outlet opening.

2. The apparatus as defined in claim 1, wherein said area is located at the center of the underside of the tool holder.

3. The apparatus as defined in claim 1, wherein:

the pressure acting on the electrolyte is approximately 2 to 4 bar;

the workpiece surface to be marked is cylindrical; and the interior radius of the underside of the tool holder is larger than the radius of the workpiece surface to be marked by several hundredths of a millimeter.

4. The apparatus as defined in claim 3, wherein:

the interior radius of the underside of the tool holder is larger than the radius of the workpiece surface to be marked by 2/100 mm.

5. The apparatus as defined in claim 1, wherein:

two pins are provided, one on each side of the electrolyte outlet opening.

6. The apparatus as defined in claim 5, wherein:

the pins are of different thickness.

7. The apparatus as defined in claim 1, wherein:

the electrical connection with the metallic pin and the connection to the electrolyte outlet opening are located at a front face of the tool holder.

8. The apparatus as defined in claim 1, wherein:

the tool holder is made of plastic material which does not contain halogen.

9. The apparatus as defined in claim 1, further comprising:

a driven friction roller, and wherein:

the workpiece is in the shape of a tube and is mounted for rotation; and the driven friction roller is located opposite the workpiece mounting.

10. The apparatus as defined in claim 1, wherein:

the workpiece surface to be marked is flat; and the underside of the tool holder is flat and is movable in relation to the workpiece in the direction of both coordinates lying in the marking plane.

11. The apparatus as defined in claim 1, wherein said tool holder defines a longitudinal mid-plane and a transverse mid-plane, and wherein a single electrolyte outlet opening is provided at the intersection of the longitudinal and transverse mid-planes of the tool holder.

* * * * *